(12) United States Patent
Ryu et al.

(10) Patent No.: US 8,418,045 B2
(45) Date of Patent: *Apr. 9, 2013

(54) NETWORK INTERMEDIATE DEVICE AND METHOD THEREOF

(75) Inventors: Hyun-surk Ryu, Yongin-si (KR); Hong-kyu Jung, Yongin-si (KR); Fei fei Feng, Yongin-si (KR); Geoffrey M. Garner, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1827 days.

This patent is subject to a terminal disclaimer.

(21) Appl. No.: 11/703,781

(22) Filed: Feb. 8, 2007

(65) Prior Publication Data
US 2007/0198900 A1    Aug. 23, 2007

(30) Foreign Application Priority Data
Feb. 23, 2006    (KR) .................. 10-2006-0017680

(51) Int. Cl.
*H04L 1/00* (2006.01)
*H04L 12/54* (2006.01)

(52) U.S. Cl.
USPC ........................................... 714/807

(58) Field of Classification Search .................. 714/807
See application file for complete search history.

(56) References Cited

U.S. PATENT DOCUMENTS

| 4,692,917 | A | * | 9/1987 | Fujioka | 370/392 |
| 4,712,215 | A | * | 12/1987 | Joshi et al. | 714/776 |
| 4,862,461 | A | * | 8/1989 | Blaner | 714/749 |
| 5,307,345 | A | * | 4/1994 | Lozowick et al. | 370/428 |
| 5,764,895 | A | * | 6/1998 | Chung | 709/250 |
| 5,818,852 | A | | 10/1998 | Kapoor | 714/749 |
| 5,959,995 | A | * | 9/1999 | Wicki et al. | 370/400 |
| 6,333,929 | B1 | * | 12/2001 | Drottar et al. | 370/362 |
| 7,257,758 | B1 | * | 8/2007 | Manula et al. | 714/752 |
| 7,908,540 | B2 | * | 3/2011 | Jeong et al. | 714/758 |
| 8,185,808 | B2 | * | 5/2012 | Lee et al. | 714/784 |
| 2004/0037234 | A1 | | 2/2004 | Strawczynski et al. | 370/370 |
| 2005/0129047 | A1 | | 6/2005 | Ku et al. | |
| 2005/0207350 | A1 | | 9/2005 | Bloebaum | 370/252 |

FOREIGN PATENT DOCUMENTS
JP    63-224443 A    9/1988

OTHER PUBLICATIONS

Jeong et al., "IEEE 802.1 A/V Bridge TG", Mar. 7, 2006, pp. 1-20.
International Search Report and Written Opinion of the ISA issued on May 3, 2007, in counterpart International Application No. PCT/KR2007/000431 (10 pages).
"Notice of Preliminary Rejection" issued by the Japanese Patent Office on May 10, 2011, for Japanese Patent Application No. 2008-556230 filed Jul. 11, 2008 (3 pages including English translation).
Japanese Office Action issued May 1, 2012 in counterpart Japanese Patent Application No. 2012-000290 (3 pages, in Japanese).

* cited by examiner

*Primary Examiner* — Stephen Baker
(74) *Attorney, Agent, or Firm* — NSIP Law

(57) ABSTRACT

A network intermediate device and method are provided. The network intermediate device according to an exemplary embodiment of the present invention comprises a data transmitting/receiving part which receives frames which have header error check information, and a control part which controls the data transmitting/receiving part to start forwarding the frame before the entire frame is received by determining whether there are errors in the header using the header error check information. In this case, the frame may comprise a first field in which header error check flag information is recorded to notify whether to perform the forwarding after checking for errors in the header, and a second field in which the header error check information is recorded. If it is confirmed that the check and forward method is applied by the header error check flag information, the control part may verify the header error check information to determine whether errors occur in the header. Therefore, the relay of the frame can be stably performed within the minimum time.

28 Claims, 5 Drawing Sheets

NETWORK INTERMEDIATE DEVICE AND METHOD THEREOF

CROSS-REFERENCE TO RELATED APPLICATIONS

This application claims benefit under 35 U.S.C. §119 (a) of Korean Patent Application No. 2006-17680, filed on Feb. 23, 2006, the entire disclosure of which is hereby incorporated by reference.

TECHNICAL FIELD

The following description relates to a network intermediate device and a method thereof, and more particularly, to a network intermediate device and a method thereof wherein forwarding of frames starts before all frames are received if errors are not found after checking for errors in headers when frames are received.

BACKGROUND

Due to advances in network technology, a residential Ethernet network has been developed and supplied so that a user can conveniently control products by connecting electronic home appliances through networks. The residential Ethernet network is a home network, which provides a network environment to allow amongst others for transmission of time-sensitive traffic, in other words high quality audio/video traffic on Ethernet networks. IEEE 802 is considering new standards for residential Ethernet networks.

In a residential Ethernet network, a network intermediate device is indispensable for relaying transmission of data frames between nodes. Specifically, an A/V bridge operates as a network intermediate device to relay A/V data frames. In the A/V data frame transmission, the time required for the relay process is important. In other words, in order for nodes to output A/V data while maintaining synchronization between video and audio data, audio data frames and video data frames must be received within a specified period of time. In particular, in a case of broadcasting live data, continuous transmission is required in order to prevent the broadcast from stopping and to minimize delays in the intermediate transmission. Generally, it is required that a delay in A/V traffic transmission between sources and destination nodes on a residential Ethernet network is less than 2 ms.

In a conventional network intermediate device, the frames are transmitted by a store-and-forward method or a cut-through switching method. In the store-and-forward method, a frame received from the network intermediate device is stored, and then errors for the entire frame are checked using a cyclic redundancy check (CRC) value contained at the end of the frame. If errors are not found, the frame is forwarded to the destination recorded in a frame header.

In the store-and-forward method, a frame can be stably transmitted, but there is a problem in that a delay in relaying a frame is increased because the transmission is delayed for the time required for storing the entire frame by the network intermediate device. Specifically, assuming that a frame of 64 bytes is relayed in a fast Ethernet environment, about 2 μs is required to receive, store, and check the header, verify the destination address in the header to decide the destination, and command forwarding to the destination. Receiving, storing and transmitting the entire frame by a forwarding command takes about 5.12 μs. As a result, the time required for relaying a frame of 64 bytes is about 7.12 μs. Additionally, assuming that a frame of about 1526 bytes is relayed, the time required for processing the header in the same manner as described above is 2 μs, but, the time taken from the storage to the transmission of the frame is greatly increased to 122.08 μs. As a result, the total time of 124.08 μs is required. A plurality of network intermediate devices may exist on a frame transmission path between sources and destinations. Therefore, there is a problem in that the time required for transmitting the entire frame can exceed 2 ms.

The cut-through switching method is a method for forwarding and receiving a frame at the same time without storing the frame, by verifying the destination address of the header as soon as the frame is received. In the cut-through switching method, the forwarding is performed rapidly so that the delay in relaying can be minimized. However, when errors are found in the header, and particularly, in a field where the destination address is recorded, there is a risk that the frame may be relayed through other networks. In other words, since the CRC value for checking for errors in the frame is located at the end of each frame, the errors in the frame cannot be checked in this situation. Accordingly, there is a problem in that errors may be propagated while relaying the frames.

Accordingly, there is a need for an improved network intermediate device and method for checking for errors and forwarding a frame.

SUMMARY

In one general aspect, a network intermediate device is provided, comprising a data transmitting/receiving part which receives a frame with header error check information for determining whether errors occur in a header, and a control part which controls the data transmitting/receiving part to begin to transmit the frame to the destination before the entire frame is received if it is determined by using the header error check information that there are no errors in the header.

The frame may comprise a first field, wherein header error check flag information is recorded to notify whether a check and forward method is applied for performing the forwarding after checking for errors in the header, and a second field, wherein the header error check information is recorded.

The first and second fields may each comprise at least one byte corresponding to a payload in the frame. The first and second fields may each be included in the header of the frame.

In another general aspect, a network intermediate device further comprises a memory part for storing the frame received by the data transmitting/receiving part.

The control part verifies the header error check flag information stored in the first field when the header is completely stored in the memory part, to determine whether the check and forward method is applied. If it is confirmed that the check and forward method is applied, the control part may verify the header error check information stored in the second field to determine whether errors occur in the header.

If it is confirmed that the check and forward method is not applied, the control part determines whether errors are found in the entire frame when the entire frame is completely stored in the memory part. If it is confirmed that there are no errors in the frame, forwarding of the frame may start.

If it is confirmed that the check and forward method is not applied, the control part may calculate a cyclic redundancy check (CRC) value for the entire frame and compare the calculated CRC value with a frame CRC value contained in the frame to determine whether errors are found for the entire frame.

The header error check information may be a CRC value.

If it is confirmed that the check and forward method is applied, the control part may calculate the CRC value for the header and compare the calculated CRC value with a CRC value recorded in the second field. If the two values are the same, it is determined that there are no errors in the header, and if the two values are different, it is determined that there are errors in the header.

The header error check information recorded in the second field may be a checksum, parity bits and the like.

In another general aspect, a method for operating relaying networks in a network intermediate device comprises receiving frames with header error check information for determining whether errors occur in a header, determining whether errors occur in the header by using the header error check information, and beginning a transmission of the frame to the destination before the entire frame is received if it is determined that there are no errors in the header.

A frame comprises a first field in which header error check flag information is recorded to notify whether a check and forward method is applied for performing the forwarding after checking for errors in the header, and a second field in which the header error check information is recorded.

First and second fields may each comprise at least one byte corresponding to a payload in the frame. The first and second fields may each be included in the header of the frame.

In a further general aspect, a method may further comprise storing the received frame in a memory part, and determining whether the check and forward method is applied by verifying the header error check flag information stored in the first field when the header is completely stored in the memory part.

At this time, determining whether errors occur and transmitting the frame may be performed when it is confirmed that the check and forward method is applied.

In another general aspect, a method may further comprise determining whether errors are found for the entire frame when the entire frame is completely stored in the memory part if it is confirmed that the check and forward method is not applied, and transmitting the frame to the destination if it is confirmed that errors for the frame are not found.

The header error check information may be a cyclic redundancy check (CRC) value.

If it is confirmed that the check and forward method is applied, determining whether errors occur in the header may include a calculation of the CRC value for the header and a comparison of the calculated CRC value with a CRC value recorded in the second field, and as a result, if the two values are the same, it is determined that there are no errors in the header and if the two values are different, it is determined that there are errors in the header.

The header error check information recorded in the second field may be a checksum, parity bits and the like.

The network intermediate device may form residential Ethernet networks and may be an audio/video (A/V) bridge which relays the transmission of A/V data frames.

BRIEF DESCRIPTION OF THE DRAWINGS

Throughout the drawings, the same drawing reference numerals will be understood to refer to the same elements, features, and structures.

DETAILED DESCRIPTION

The matters defined in the description such as a detailed construction and elements are provided to assist in a comprehensive understanding of the devices, methods, and systems described herein. Accordingly, those of ordinary skill in the art will recognize that various changes and modifications of the devices, methods, and systems described herein can be made without departing from the scope and spirit of the devices, methods, and systems. Also, descriptions of well-known functions and constructions are omitted for clarity and conciseness.

Figure 1:
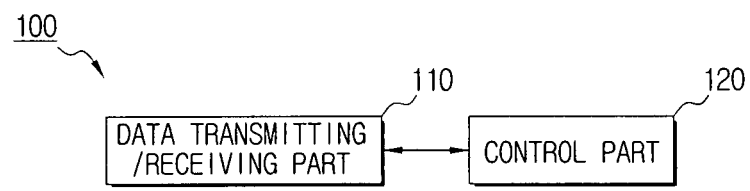
FIG. 1 is a block diagram showing a network intermediate device of a general aspect.

FIG. 1 is a block diagram showing a network intermediate device according to a general aspect. Referring to FIG. 1, a network intermediate device 100 includes a data transmitting/receiving part 110 and a control part 120. The data transmitting/receiving part 110 can be implemented as a means using medium access control (MAC) and physical (PHY) layers, and the control part 120 can be implemented as a means using a protocol adaptation layer (PAL). The network intermediate device 100 can be implemented as an A/V bridge in forming residential Ethernet networks.

The data transmitting/receiving part 110 receives frames from other nodes, and specifically, may receive audio frames and video frames.

The control part 120 detects header error check information recorded in the frame which is received by the data transmitting/receiving part 110, to determine whether errors occur in the header. In this case, the header error check information may be any one of a cyclic redundancy check (CRC) value, a checksum, parity bits, and the like.

If parity bits are used, source nodes calculate the sum of the data bits of the header before the frame transmission. Accordingly, if the sum of the data bits is an even number, the parity bits are set to 1. If the sum of the data bits is an odd number, the parity bits are set to 0. The control part 120 verifies whether the sum of bits of the header of the received frame is an even or odd number. If the sum is an even number, it is recognized that errors occur during the transmission. On the other hand, if the sum is an odd number, it is recognized that there are no errors in the header.

If a checksum is used, source nodes recognize data of the header as a series of binary numbers, calculate a sum of the binary numbers and record the sum in a certain field in the frame header. The control part 120 calculates the checksum of the header, and compares it with the checksum recorded in the header. As a result of the comparison, if the two values are the same, it is recognized that there are no errors in the header, on the other hand, if the two values are different, it is recognized that there are errors in the header.

CRC is a method of applying a bit polynomial applied to the data of the header. For example, when the 32-bit polynomial is used, source nodes apply the 32-bit polynomial to the data of the header to obtain a code, and the obtained code is then recorded in a certain field in the header. The control part 120 applies the same polynomial with respect to the header, to compare the result with a value recorded in the header. As a result of the comparison, if the two values are the same, it is recognized that there are no errors in the header, on the other hand, if the two values are different, it is recognized that there are errors in the header.

If it is determined that there are no errors in the header, the control part 120 controls the data transmitting/receiving part 110 in order to start the frame forwarding even before the entire frame is received. In other words, the control part 120 verifies the destination address recorded in the frame header to forward the frame to a network including the destination. Accordingly, the receiving operation and the transmitting operation of the frame are performed at the same time, and thus, the time required for retransmission after the storage of the frame payload is saved as compared to a conventional store-and-forward method. Since errors in the header are checked before forwarding the frame, it is possible to relay the frame more stably as compared to a conventional cut-through switching method. As described above, a method for forwarding directly after checking only for errors in the header is designated as a check and forward method.

Header error check flag information may be further recorded in the frame to notify whether the check and forward method is performed. The control part 120 verifies the header error check flag information to determine whether to forward after checking the errors in the header as described above if it is recognized that the check and forward method is performed. On the other hand, if it is recognized that the check and forward method is not performed by the header error check flag information, the frame can be forwarded using any of the original methods.

Figure 2:
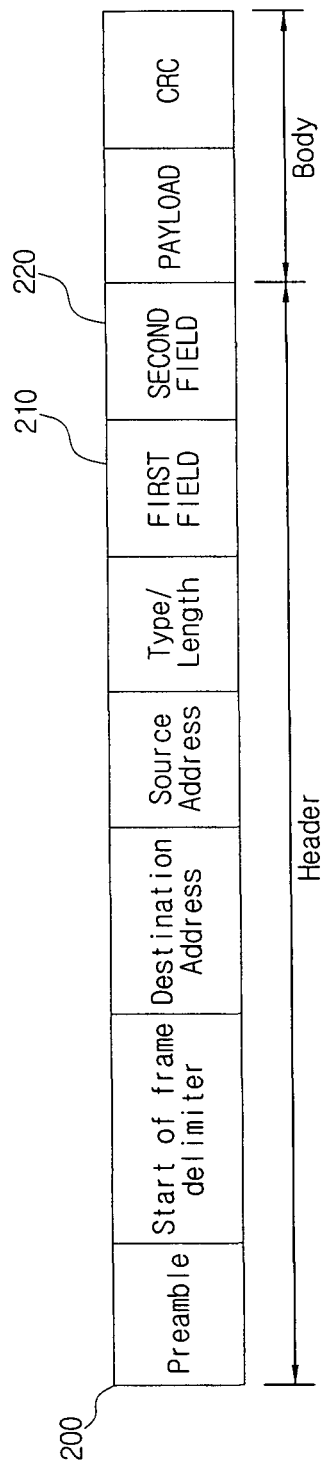
FIG. 2 is a conceptual diagram showing an example of a frame relayed in the network intermediate device.

FIG. 2 is a conceptual diagram showing an example of a frame relayed in the network intermediate device of FIG. 1. Referring to FIG. 2, a frame 200 consists of a header and a body.

In the header, a preamble, a start of frame delimiter (SFD), the destination address, the source address and the frame type/length are recorded. These fields can be implemented in the same manner as in original frame headers. The preamble is used for matching bit synchronization among destination nodes and has a bit pattern of 7 bytes. An SFD is the start of the actual frame and is one byte in size with a bit pattern of "10101011". The destination address corresponds to the medium access control (MAC) address of the destination node, and the source address corresponds to the MAC address of the source node. The destination and the source addresses have bit patterns of 6 bytes, each. In the frame type/length, information on the type and length of the frame 200 is recorded, and the frame type/length consists of a bit pattern of about 2 bytes.

Referring to the frame of FIG. 2, a first field 210 and a second field 220 are newly added to the original header. The first and second fields 210 and 220 may consist of several bytes each, corresponding to the payload in the original frame. For example, the first field 210 may consist of 1 byte, and the second field 220 may consist of 1 or 2 bytes.

As shown in FIG. 2, when the first and second fields 210 and 220 are provided by occupying the beginning of the payload area, the frame header defined in the original standard can be kept in the original state. In this case, the first and second fields 210 and 220 as added above can also be seen as a new header. The first and second fields 210 and 220 can consist of at least one byte, each. In addition, the first and second fields 210 and 220 may be provided in other parts of the frame. In the first field 210, header error check flag information notifying whether the check and forward method is applied is recorded. The control part 120 checks the bit pattern of the header error check flag information to determine whether the check and forward method is applied (ON state) or not applied (OFF state). Specifically, when the header error check flag information is set to two patterns, 10101001 and 01010110, the OFF state is recognized when recorded as "10101001", and the ON state is recognized when recorded as "01010110". If the header error check flag information is in the OFF state, the second field 220 may be used as the payload. General data can be recorded and used also in the bytes allocated in the second field 220.

Header error check information for only the header is recorded in the second field 220. As described above, the header error check information may comprise CRC, checksum, parity bits and the like.

The body comprises a payload and CRC. Among these, the payload is a region in which data is actually recorded and has a size of about 46 to 1500 bytes.

In CRC included in the body, the CRC value for all frames 200 is recorded. When the check and forward method is not applied, the control part 120 may determine whether errors for the frame are found by using CRC included in the body to decide whether to forward depending on the result of the determination. If errors are found, the frame is discarded. On the other hand, if errors are not found, the frame is forwarded to the network with the destination node.

As described above, when the check and forward method is not applied, a conventional forwarding method can be used. For example, the forwarding may be performed after storing the entire frame by the store-and-forward method. For this reason, a storage space for storing all frames is required.

Figure 3:
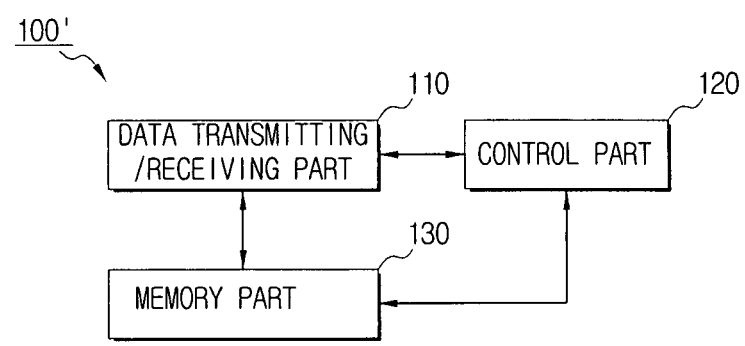
FIG. 3 is a block diagram showing a network intermediate device according to another general aspect.

FIG. 3 is a block diagram showing a network intermediate device according to another general aspect. A network intermediate device 100' of FIG. 3 can selectively adopt at least one of the check and forward method and the store-and -forward method. The network intermediate device 100' of FIG. 3 further comprises a memory part 130 in addition to the data transmitting/receiving part 110 and the control part 120. The data transmitting/receiving part 110 and the control part 120 in FIG. 3 are described with the same reference numbers as in FIG. 1.

The data transmitting/receiving part 110 receives the frame 200 in which the first and second fields 210 and 220 are included in the header, as shown in FIG. 2.

The frame 200 received by the data transmitting/receiving part 110 is stored in the memory part 130.

The control part 120 verifies the header error check flag information recorded in the first field 210 when the header is completely stored, to determine whether the check and forward method is adopted. Accordingly, if it is determined that the check and forward method is applied, whether errors occur in the header is determined by using the header error check information recorded in the second field 220. Forwarding is performed according to the result of the determination. In other words, when errors are not found, the frame 200 is forwarded to the destination, and when errors are found, the receiving of the frame 200 is stopped or the frame is discarded as soon as it is received.

If it is determined that the check and forward method is not applied, the control part 120 is operated by the store-and-forward method. That is, the control part 120 waits until the entire frame 200 is stored in the memory part 130. When the entire frame is completely stored in the memory part 130, whether errors for the entire frame 200 occur is checked using CRC included at the tail of the frame 200. Accordingly, if errors are not found, the frame 200 is forwarded, and if errors are found, the frame is discarded.

Figure 4:
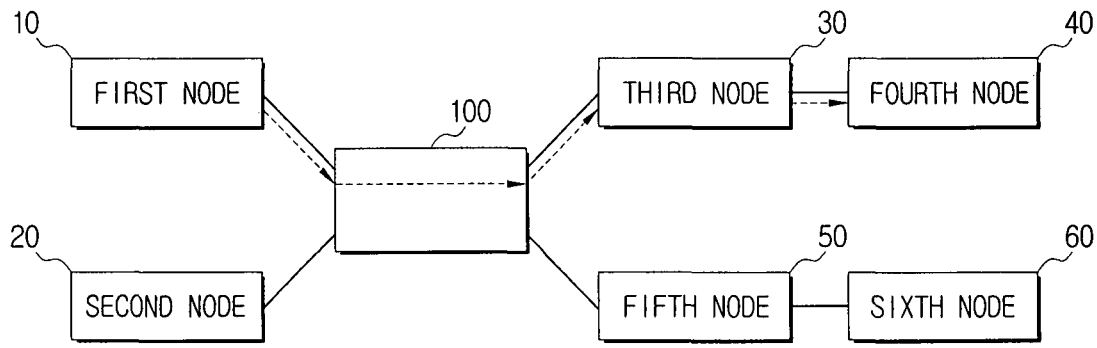
FIG. 4 is a conceptual diagram showing a residential Ethernet network according to a general aspect.

FIG. 4 is a conceptual diagram showing a residential Ethernet network comprising a network intermediate device according to a general aspect. The network intermediate device 100 of FIG. 1 is applied in FIG. 4. The network intermediate device 100' of FIG. 3 may be also applied. Referring to FIG. 4, the residential Ethernet network comprises a first node to a sixth node 10 to 60 and the network intermediate device 100. In FIG. 4, only one network intermediate device 100 is shown, but a plurality of network intermediate devices may be also involved in relaying the frame.

When the first node 10 is a source node, the first node 10 records the header error check information in the frame header. Then, the frame is transmitted to the network intermediate device 100.

In the network intermediate device 100, errors for the received frame header are checked using the header error check information. Accordingly, if it is determined that there are no errors in the header, the destination address is detected from the header, and then the forwarding of the frame starts even before the entire frame is received. Assuming that the destination node is the fourth node 40, the network intermediate device 100 forwards the frame to the third node 30 located prior to the destination. The frame data received after starting the forwarding is directly forwarded without being stored in the network intermediate device 100. In this case, the header data is transmitted, and then the remaining frame data is transmitted. When the total size of the frame data is 64 bytes, the time required for processing the header is about 2 μs. Furthermore, the time required for transmitting the header data and receiving the remaining frame data to be forwarded is about 2 μs. As a result, the time required for relaying the entire frame is about 4 μs. It can be found that the time for relaying is considerably reduced in comparison to the conventional store-and-forward method, in which the time for relaying is about 7.12 μs.

As the total size of the frame data increases, the difference in the relay speed increases compared to the store-and-forward method. In other words, since the size of the header is the same even when the total size of the frame data is 1526 bytes, the time required for processing the header is about 2 μs. Since the remaining frame data is forwarded as soon as it is received, the time required for receiving and processing the frame data is also about 2 μs regardless of the total size of the frame data. Therefore, although the total size of the frame data is 1526 bytes, the total time for relaying is only about 4 μs. It can be found that the time for relaying is considerably reduced in comparison to the conventional store-and-forward method in which the time for relaying is 124.08 μs.

Figure 5:
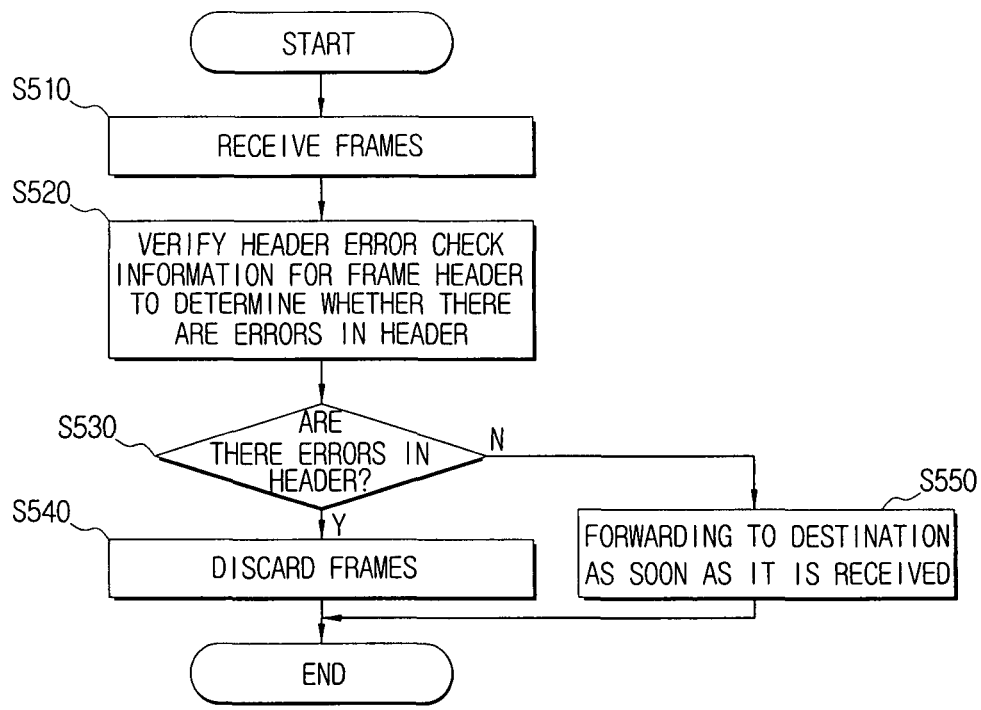
FIG. 5 is a flowchart explaining a method for relaying networks according to a general aspect.

FIG. 5 is a flowchart explaining a method for operating relaying networks according to a general aspect. In operation S510, the frame in which the header error check information is recorded in the header is received. Accordingly, whether errors occur in the header is determined using the header error check information recorded in the header (S520).

As a result of the determination, if it is determined that there are errors in the header (S530), the frame is discarded (S540). In this case, with respect to the frame data which is not received, the reception itself can be refused. On the other hand, if it is determined that there are no errors in the header, the frame data is forwarded to the destination at the same time as it is received (S550). The forwarding starts even before the entire frame is received, and the receiving of the remaining frame data is carried out simultaneously with the transmitting of the frame data already received.

Figure 6:
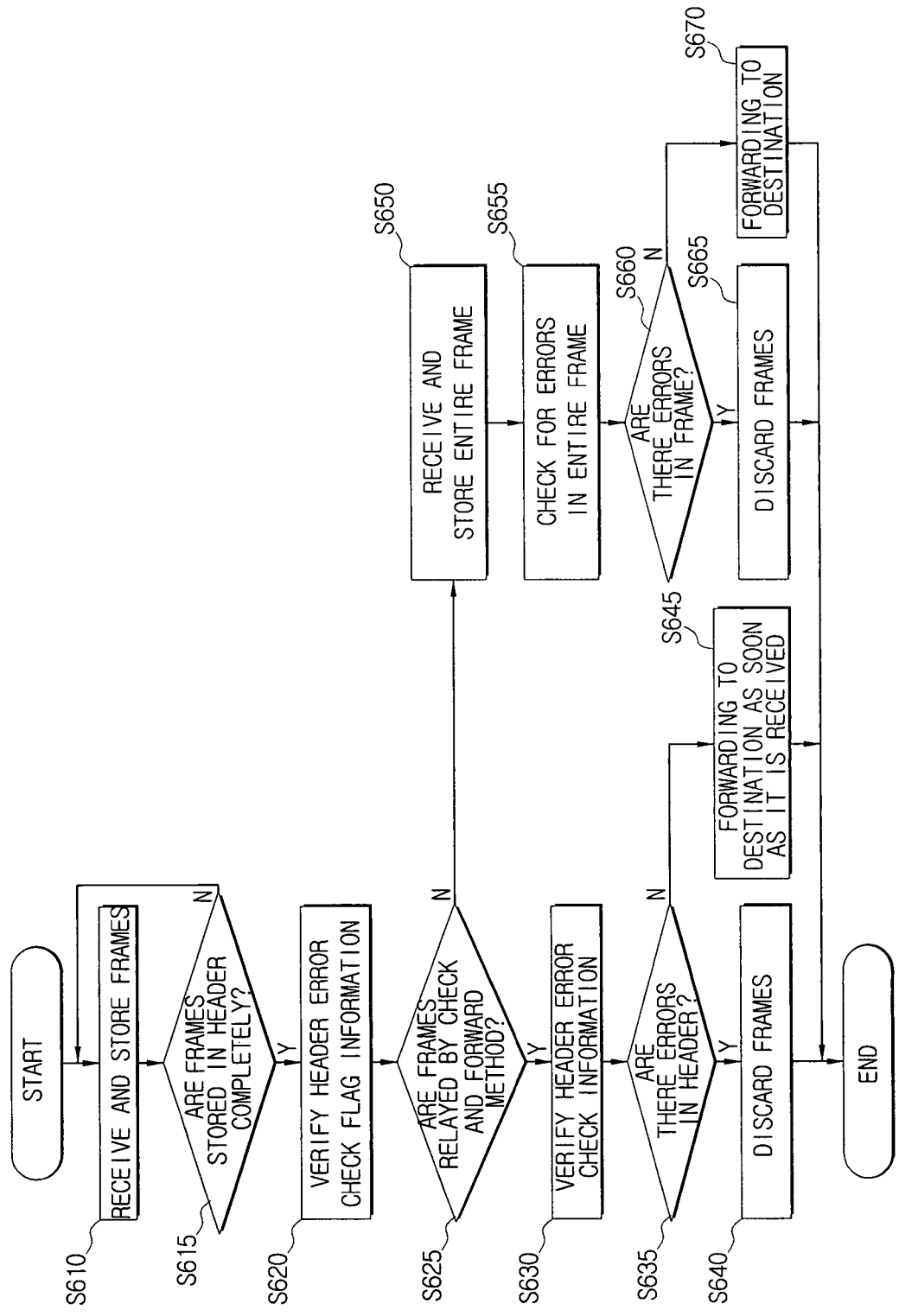
FIG. 6 is a flowchart explaining a method for relaying networks according to another general aspect.

FIG. 6 is a flowchart explaining a method for relaying networks according to a general aspect. In operation S610, the frame 200 is stored in the memory part 130 as soon as it is received. Accordingly, when the header is completely stored (S615), the header error check flag information recorded in the first field 210 of the header is verified (S620). As a result, if it is determined that the relay is performed by the check and forward method (S625), the header error check information recorded in the second field 220 of the header is verified (S630). Accordingly, if it is determined that there are errors in the header (S635), the frame 200 is discarded (S640). In this case, with respect to the remaining frame data, the receiving itself can be refused. On the other hand, if it is determined that there are no errors in the header (S635), the frame data is forwarded to the destination at the same time as it is received (S645).

If it is determined that the relay is not performed by the check and forward method (S625), the relay is performed by the store-and-forward method. In other words, the entire frame is received and stored (S650).

Subsequently, errors for the entire frame are checked (S655). If it is determined that there are errors in the frame (S660), the frame is discarded (S665). On the other hand, if it is determined that there are no errors in the frame, the frame is forwarded to the destination (S670). Accordingly, since errors in the header can be checked, it is possible to prevent the frame 200 from being transmitted to nodes other than the destination node.

According to general aspects described above, after checking whether errors occur in the header of the frame, the forwarding of the frame starts. Therefore, it is possible to prevent the frame from being transmitted to the wrong destination nodes, and accordingly, the frame can be relayed safely. If the frame header is normal, the forwarding of the frame starts immediately before the entire frame is received, so that the time required for relaying the frame can be minimized. Accordingly, it is possible to fill the time for transmitting the A/V data frame, which is time-sensitive traffic. Consequently, an A/V transmission service on the residential Ethernet network environment can be implemented normally.

While the devices, methods, and systems described herein have been shown and described with reference to certain aspects thereof, it will be understood by those skilled in the art that various changes in form and details may be made therein without departing from the spirit and scope of the devices, methods, and systems described herein as defined by the appended claims.

What is claimed is:

1. A network intermediate device comprising:
   a data transmitting/receiving part configured to receive a frame, the frame comprising a header including header error check information and header error check flag information that indicates whether or not a check and forward method is to be applied; and
   a control part configured to determine from the header error check flag information whether the check and forward method is to be applied, and
   if the check and forward method is to be applied, to control the data transmitting/receiving part to begin a transmission of the frame to a destination before an entirety of the frame is received by the data transmitting/receiving part if it is determined by using the header error check information that there are no errors in a header; and
   if the check and forward method is not to be applied, to determine whether there are errors in the entirety of the frame when the entirety of the frame is stored in the memory, and begin transmission of the frame if it is determined that there are no errors in the frame,
   wherein the header error check information comprises a checksum, parity bits or both.

2. The network intermediate device as claimed in claim 1, wherein, if it is determined that the check and forward method is not applied, the control part calculates a cyclic redundancy check (CRC) value for the entirety of the frame and compares the calculated CRC value with a frame CRC value contained in the frame to determine whether errors are found for the entirety of the frame.

3. The network intermediate device as claimed in claim 1, wherein the header error check information comprises a cyclic redundancy check (CRC) value.

4. The network intermediate device as claimed in claim 3, wherein, if it is determined that the check and forward method is applied, the control part calculates a CRC value for the header and compares the calculated CRC value with the CRC value of the header error check information to determine that there are no errors in the header if the calculated CRC value and the CRC value of the header error check information are the same, and to determine that there are errors in the header if the calculated CRC value and the CRC value of the header error check information are different.

5. The network intermediate device as claimed in claim 1, wherein the frame further comprises:
a first field configured to record the header error check flag information; and
a second field configured to record the header error check information.

6. The network intermediate device as claimed in claim 5, wherein the first and second fields comprise at least one byte corresponding to a payload in the frame.

7. The network intermediate device as claimed in claim 5, further comprising:
a memory part configured to store the frame.

8. The network intermediate device as claimed in claim 7, wherein the control part is configured to verify the header error check flag information stored in the first field when the header is completely stored in the memory part, and
wherein, if it is determined that the check and forward method is applied, the control part verifies the header error check information stored in the second field to determine whether errors occur in the header.

9. A method for relaying information using a network intermediate device, the method comprising:
receiving a frame comprising a header including header error check information and header error check flag information that indicates whether or not a check and forward method is to be applied;
determining from the header error check flag information whether the check and forward method is to be applied;
if the check and forward method is to be applied,
determining whether errors occur in a header by using the header error check information; and
beginning transmission of the frame to a destination before an entirety of the frame is received if it is determined that there are no errors in the header; and
if the check and forward method is not to be applied,
determining whether there are errors in the entirety of the frame when the entirety of the frame is stored in the memory, and
beginning transmission of the frame if it is determined that there are no errors in the frame.

10. The method as claimed in claim 9, wherein the header error check information includes a checksum, parity bits or both.

11. The method as claimed in claim 9, wherein the network intermediate device forms residential Ethernet networks and includes an audio/video (A/V) bridge which relays transmission of A/V data frames.

12. The method as claimed in claim 9, wherein the header error check information includes a cyclic redundancy check (CRC) value.

13. The method as claimed in claim 12, wherein, if it is determined that the check and forward method is applied, the determining of whether errors occur further comprises:
calculating a CRC value for the header; and
comparing the calculated CRC value with the CRC value of the header error check information, to determine that there are no errors in the header if the calculated CRC value and the CRC value of the header error check information are the same, and to determine that there are errors in the header if the calculated CRC value and the CRC value of the header error check information are different.

14. The method as claimed in claim 9, wherein the frame includes a first field configured to record header error check flag information and a second field configured to record the header error check information.

15.

16. The method as claimed in claim 14, wherein the first and second fields include at least one byte corresponding to a payload in the frame.

17. The method as claimed in claim 14, further comprising:
storing the frame in a memory part; and
determining whether the check and forward method is applied by verifying the header error check flag information stored in the first field when the header is completely stored in the memory part.

18. The method as claimed in claim 17, further comprising:
determining that the check and forward method is applied prior to the determining of whether errors occur and the beginning of transmission.

19. A network intermediate device comprising:
a data transmitting/receiving part configured to receive a frame, the frame comprising a header including header error check flag information that indicates whether or not a check and forward method is to be applied; and
a control part configured to determine from the header error check flag information whether the check and forward method is to be applied,
wherein the header comprises a checksum, parity bits or both.

20. The network intermediate device as claimed in claim 19, wherein the header comprises header error check information.

21. The network intermediate device as claimed in claim 20, wherein the control part is configured to perform a determination of errors in the header using the header error check information.

22. The network intermediate device as claimed in claim 21, wherein the control part is configured to perform the determination of errors in the header using the header error check information after determining a value of the header error check flag information.

23. The network intermediate device as claimed in claim 22, wherein the data transmitting/receiving part concurrently receives and transmits the frame if the control part determines that there are no errors in the header.

24. A method for relaying information using a network intermediate device, the method comprising:
receiving a frame comprising a header including header error check flag information that indicates whether or not a check and forward method is to be applied;
determining from the header error check flag information whether the check and forward method is to be applied, wherein
the header comprises a checksum, parity bits or both.

25. The method as claimed in claim 24, wherein the header comprises header error check information.

26. The method as claimed in claim 25, further comprising: determining whether there are errors in the header using the header error check information using the header error check information.

27. The method as claimed in claim 26, wherein determining errors in the header using the header error check information occurs after determining a value of the header error check flag information.

28. The method as claimed in claim 27, further comprising: concurrently receiving and transmitting the frame if there are no errors in the header.

\* \* \* \* \*